US012124484B2

(12) United States Patent
Song et al.

(10) Patent No.: US 12,124,484 B2
(45) Date of Patent: Oct. 22, 2024

(54) REAL-TIME GEO-INTELLIGENT AGGREGATION ENGINE

(71) Applicant: Visa International Service Association, San Francisco, CA (US)

(72) Inventors: Hongqin Song, Austin, TX (US); Yu Gu, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 78 days.

(21) Appl. No.: 17/632,342

(22) PCT Filed: Aug. 2, 2019

(86) PCT No.: PCT/US2019/044986
§ 371 (c)(1),
(2) Date: Feb. 2, 2022

(87) PCT Pub. No.: WO2021/025671
PCT Pub. Date: Feb. 11, 2021

(65) Prior Publication Data
US 2022/0300537 A1    Sep. 22, 2022

(51) Int. Cl.
*G06F 16/00* (2019.01)
*G06F 16/22* (2019.01)
(Continued)

(52) U.S. Cl.
CPC .............. *G06F 16/29* (2019.01); *G06F 16/22* (2019.01); *G06F 16/24556* (2019.01)

(58) Field of Classification Search
CPC ..... G06F 16/29; G06F 16/22; G06F 16/24556
See application file for complete search history.

(56) References Cited

U.S. PATENT DOCUMENTS 8,938,686 B1 *  1/2015  Erenrich ............... G06F 40/143
                                                  715/781
9,719,790 B2     8/2017  Agrawal et al.
(Continued)

OTHER PUBLICATIONS

Application No. EP19940702.4, Extended European Search Report, Mailed on May 20, 2022, 7 pages.
(Continued)

*Primary Examiner* — Dinku W Gebresenbet
(74) *Attorney, Agent, or Firm* — Kilpatrick Townsend & Stockton LLP

(57) ABSTRACT

A real-time geo-intelligent aggregation engine and related methods are disclosed. The real-time geo-intelligent aggregation engine can be used to provide interaction event data corresponding to a geographic coordinate point and a boundary element to requestors or requestor computers. After receiving a request from a requestor computer, the real-time geo-intelligent aggregation engine can determine one or more geohashes corresponding to a geographic region. The one or more geohashes can be used to query a geographic resource provider database to determine a list of resource providers acting within the geographic region. The list of resource providers can be used to query a resource provider interaction database to determine interaction event data corresponding to those resource providers. The interaction event data can subsequently be provided to the requestor computer. The requestor computer and/or a requestor associated with the requestor computer can perform subsequent action based on the interaction event data.

20 Claims, 10 Drawing Sheets

(51) Int. Cl.
   *G06F 16/2455*   (2019.01)
   *G06F 16/29*   (2019.01)

(56) References Cited

U.S. PATENT DOCUMENTS

| | | |
|---|---|---|
| 2009/0222358 A1 | 9/2009 | Bednarek |
| 2012/0226889 A1 | 9/2012 | Merriman et al. |
| 2013/0097163 A1* | 4/2013 | Oikarinen ............... G06F 16/29 707/736 |
| 2015/0264523 A1 | 9/2015 | Xu et al. |
| 2018/0011888 A1 | 1/2018 | Rana et al. |
| 2018/0322175 A1 | 11/2018 | Kara et al. |
| 2019/0066141 A1 | 2/2019 | Jaramillo |
| 2020/0026805 A1* | 1/2020 | Dasgupta ........... G06Q 30/0201 |
| 2020/0356882 A1* | 11/2020 | Antoine ................ G06F 9/5011 |

OTHER PUBLICATIONS

PCT/US2019/044986, "International Search Report and Written Opinion", May 1, 2020, 12 pages.
"Archived Content," https://www12.statcan.gc.ca/census-recensement/2011/ref/dict/geo016-eng.cfm, 4 pages (2015).
Application No. EP19940702.4, Office Action, Mailed on Dec. 19, 2023, 6 pages.
EP19940702.4, "Summons to Attend Oral Proceedings", Apr. 30, 2024, 7 pages.

\* cited by examiner

| LOCATION ID | CATEGORY CODE | TIMESTAMP | TRANSACTION NUMBER | TRANSACTION AMOUNT |
|---|---|---|---|---|
| 97306 | 1000 | 2019-01-01-00:00:00 | 1 | $2.33 |
| 10002 | 333 | 2019-01-01-00:00:12 | 2 | $100.00 |
| 94612 | 5411 | 2019-01-01-00:00:16 | 3 | $17.12 |
| ... | ... | ... | ... | ... |

| RESOURCE PROVIDER ID | TIMESTAMP | TRANSACTION NUMBER | TRANSACTION AMOUNT |
|---|---|---|---|
| 10 | 2019-05-05-12:00:00 | 28 | $654.88 |
| 10 | 2019-05-05-13:02:12 | 29 | $1254.88 |
| ... | ... | ... | ... |
| 10 | 2019-06-05-12:00:00 | 58 | $2254.88 |
| 11 | 2019-06-01-12:00:00 | 51 | $754.88 |
| 11 | 2019-06-01-13:02:12 | 52 | $1554.88 |
| ... | ... | ... | ... |
| 11 | 2019-06-05-9:15:06 | 81 | $2354.88 |

FIG. 4

REAL-TIME GEO-INTELLIGENT AGGREGATION ENGINE

CROSS-REFERENCES TO RELATED APPLICATIONS

This application is a National Stage of International Application No. PCT/US2019/044986, filed on Aug. 2, 2019, which is herein incorporated by reference in its entirety for all purposes.

BACKGROUND

The geographic distribution of interactions is sometimes used in analysis of interaction-driven sciences. Interactions, generally, are events that involve two or more objects or entities, such as a predation between a predator and prey, or a transaction between two people. For localized objects or entities, the location of those objects or entities can influence what interactions take place, the characteristics of these interactions, and their outcomes. Scientists, economists and organizations sometimes perform comparative studies based on geographic location, such as studies of predator-prey behavior at different latitudes or consumer spending in different cities.

A continual, several hundred year old trend in analytics is the movement from intuition-driven analysis to data-driven analysis. More recently, advancements in computer and memory technology have enabled efficient capture, storage, and automated analysis of data. As a result, entities, such as scientists, businesspeople, economists, etc., are now able to store and evaluate increasingly large sets of data.

However, there is a trade-off between the amount of data stored in a database and the rate at which data can be retrieved from that database. Typically, the more data stored in a database, the longer it takes to search the database in order to find data relevant to analysis. This can pose a problem for geographic-based interaction analysis, because it can be time consuming to search through every entry large distributed databases in order to find interaction data relevant to a particular geographic region. For real-time applications (e.g., those with quantifiable time constraints), slow data retrieval can pose problems and negatively impact the experience of entities, such as scientists, businesspeople and policy-makers.

Embodiments address these and other problems, individually and collectively.

SUMMARY

One embodiment is directed to a method comprising: receiving, by a database management computer, from a requestor computer associated with a requestor, a request for interaction event data corresponding to a geographic region, the request comprising a location identifier and a boundary element; determining, by the database management computer, one or more geohashes corresponding to the geographic region based on the location identifier and the boundary element; querying by the database management computer, a geographic resource provider database using the one or more geohashes to determine one or more resource provider identifiers; querying, by the database management computer, a resource provider interaction database using the one or more resource provider identifiers to determine one or more interaction events; retrieving, by the database management computer, from the resource provider interaction database, interaction event data or derivatives thereof; and providing, by the database management computer, the interaction event data or derivatives thereof to the requestor computer, wherein the requestor computer and/or the requestor takes subsequent action based on the interaction event data or derivatives thereof.

Another embodiment is directed to a database management computer comprising: a processor; and a non-transitory computer readable medium coupled to the processor, the non-transitory computer readable medium comprising code, executable by the processor for implementing the above-referenced method.

Terms

A "server computer" may include a powerful computer or cluster of computers. For example, the server computer can be a large mainframe, a minicomputer cluster, or a group of servers functioning as a unit. In one example, the server computer may be a database server coupled to a web server. The server computer may comprise one or more computational apparatuses and may use any of a variety of computing structures, arrangements, and compilations for servicing the requests from one or more client computers.

A "memory" may be any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may include any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

"Entities" may include things with distinct and independent existence. For example, entities may include people, organizations (e.g., partnerships and businesses), computers, and computer networks, among others. An entity can communicate or interact with its environment in some manner. Further, an entity can operate, interface, or interact with a computer or computer network during the course of its existence.

A "requestor" may include an entity that makes requests of other entities. A "request" may include a message or other communication asking for something. As examples, a request for data stored on a hosting server, a request for confirmation of receipt of another message, or a request for executable code or other instructions.

A "resource" may include something that can be used by entities or distributed between entities. Examples of resources include goods, services, rights (e.g., the right to access a place or thing), and/or the like.

A "resource provider" may include an entity that provides a resource to other entities. Examples of resource providers include merchants, land, and governments. A resource provider such as a merchant may provide goods or services to clients as part of transactions with clients.

A "client" may include an entity that receives or uses the services of another entity. For example, a client may include a human that receives a service from another human, such as the client of a law firm. As another example, a client may include a computer system that receives a service from another computer system, such as a desktop computer that receives applications or data from a remote server computer. A computer system operated by a client may be referred to as a "client computer."

An "interaction" may include a reciprocal action, effect or influence. For example, an interaction could be an exchange or transaction between two or more parties. An interaction that takes place may be referred to as an "interaction event."

A "data type" may include a qualifier for data. A data type may define data or a set of data. For example, "height measurement" is a data type that qualifies that a "data value" such as "160 cm" is a measurement of the height of some object or entity. Other examples of data types include "location," indicating that an associated data value corresponds to location and "timestamp," indicating that an associated data value refers to a point in time.

A "data value" may include a value corresponding to data. Data values may be quantitative (e.g., height, weight, age) and may correspond to units of measurement (cm, kg, years). Alternatively, data values may be quantitative (e.g., color, location, desirability). Examples of data values include 160 cm, the zip code 94612, the timestamp 2018-12-12-2:14:00 A.M., among others.

A "data set" may include a collection of data values. A data set may also include data types or labels corresponding to the data values. Data values in a data set may share one or more characteristics or relate to the same concept, source, or entity. For example, a data set may comprise data values corresponding to a person's vital statistics (e.g., height, weight, age, blood type, etc.). As another example, a data set may comprise data values corresponding to interaction event information, such as transaction information (e.g., location of transaction, time transaction took place, amount spent, etc.) A "subset" of data may include a data set contained within a data set of greater size. One or more data sets that relate to interaction events may be referred to, individually or collectively as "interaction event data."

"Grouped data sets" may include sets, collections, or groups of data sets, in which each data sets in the group of data sets share one or more common elements. For example, for geographically distributed interaction events (e.g., interaction events that are associated with one or more geographic locations), "grouped data sets" may include data sets that are grouped based on their geographic location, such as a zip code, geographic coordinate point, or geohash. As another example, data sets may be grouped based on a common resource provider or common resource provider identifier.

"Aggregated data sets" may include sets, collections, or groups of data sets in which one or more values in each group of data sets has been aggregated. Aggregated data values include data values that have been combined in some way. As an example, aggregated data values can be sums of data values. For example, data sets corresponding to transactions may comprise data values corresponding to the transaction amount (e.g., the amount of money spent on that particular transaction). These transaction amounts may be aggregated among the data sets, in for example, a cumulative sum, in which each successive data set comprises an aggregated transaction amount corresponding to the total amount, up to and including that data set.

"Ordered data sets" may include sets, collections, or groups of data sets in which one or more data sets are ordered (e.g., within a list of data sets) based on one or more criteria. For example, if each data set in a particular group of data sets comprises a timestamp data value, the data sets in the group of data sets may be ordered in ascending or descending timestamp value. A set, collection, or group of data sets may be aggregated and ordered without restriction. That is, a group of data sets may be not aggregated, not ordered, aggregated, ordered, or aggregated and ordered.

A "geohash" refers to an interleaved element of data used to identify a particular location or region on earth. In a geohash, alternating bits represent longitudes and latitudes. For example, for an exemplary geohash such as "101010," the longitude value is "111" and the latitude value is "000." In a geohash, each successive bit identifies successively smaller and more precise geographic regions. As examples, a two bit geohash defines a region covering a quarter of the earth, while a ten bit geohash defines a region approximately half the size of the United States.

A "database" may include a set of data or sets of data stored in a computer. Alternatively, a database may include the code, instructions, file system, or other structure used to hold the set or sets of data. The term database may include related concepts, such as "data lakes," "data warehouses," "data repositories," etc.

A "string" may include a sequence of similar items. For example, a string may include a linear sequence of characters, words or other data. "Hello World" is an example of a string comprising a linear sequence of alphanumeric characters. Strings may be used to represent data sets, and data sets may be stored in databases as strings.

A "location identifier," "location ID," or "geographic region identifier" may include a data value that can be used to identify a location or geographic region. An example of a location identifier is a string such as "North America," "Texas," or "Austin." Other examples of location identifiers include zip codes, geographic coordinates (e.g., paired latitude and longitude values, GPS coordinates, etc.), geohashes, and the like.

A "boundary element" may be a value or set of values that can be used to define an area. For example, a boundary element may be a radius that defines a circle around a location, such as a 5 kilometer radius around a location. As another example, a boundary element may include multiple values to define an area (e.g., a width and a length). For example, a boundary element may be (3 km, 4 km) defining a rectangular area around a location.

BRIEF DESCRIPTION OF THE DRAWINGS

FIG. 2 shows examples of interaction event data according to some embodiments.

FIG. 4 shows a diagram of exemplary resource provider interaction event database entries according to some embodiments.

DETAILED DESCRIPTION

Figure 1:
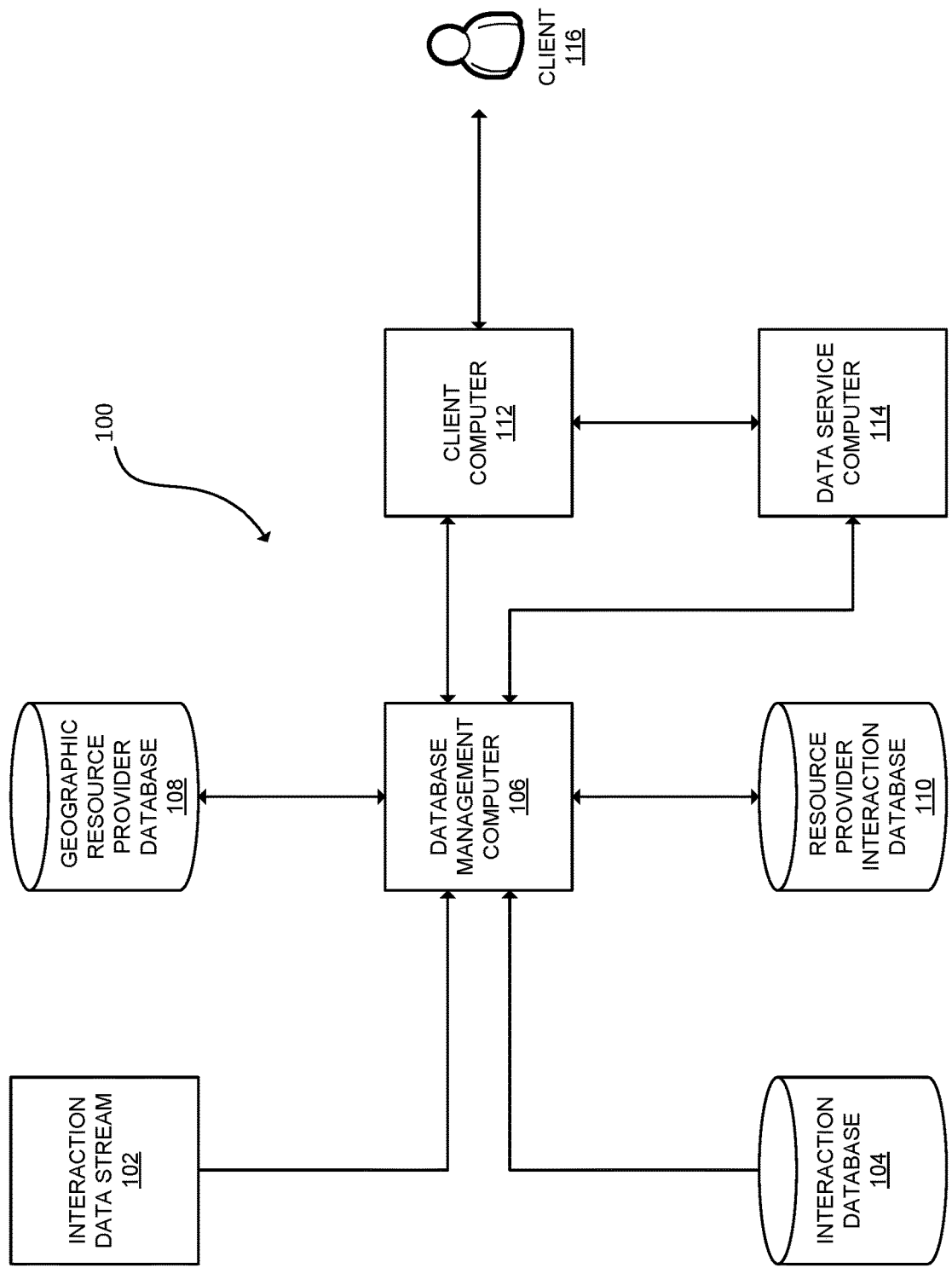
FIG. 1 shows a system block diagram of a geo-intelligent aggregation engine according to some embodiments.

Embodiments can include a real-time geo-intelligent aggregation engine that can process, manage, and retrieve geographic interaction data, along with methods enabling the real-time geo-intelligent aggregation engine to perform these functions. In some embodiments, the real-time geo-intelligent aggregation engine may comprise a database management computer, one or more databases, and optionally a data service computer.

Interaction data can comprise data corresponding to interactions between entities. In some embodiments, one entity in an interaction may be a resource provider, an entity that provides a resource to other entities involved in the interaction. As one example, a resource provider may be a merchant that sells goods or services to customers in a business transaction. As another example, a resource provider may be a forest that provides lumber to lumberjacks as part of a harvesting interaction. These interactions may be geographically localized, e.g., take place at a particular geographic location or coordinate.

Interaction data can additionally comprise other data related to the interaction, such as a time that the interaction took place (e.g., a timestamp), a category or other descriptor of the interaction (e.g., lumber harvest, transaction, sports match, etc.), descriptors or other data relating to one or more entities in the interaction (e.g., for a transaction interaction: a merchant category code, such as "grocery store" indicating that the merchant operates a grocery store), identifiers including resource provider identifiers that can be used to identify entities involved in the interaction (e.g., names such as "Alice" or "Bob's Grocery Store", or numerical identifiers such as a payment account number (PAN)), as well as interaction values (such as "$10.00," the amount spent on a purchase).

The real-time geo-intelligent aggregation engine may represent geographic coordinates as geohashes. A geohash is a data value used to represent a particular location or region. In a geohash, bits corresponding to longitudes and latitudes are interleaved. That is, the first, third, fifth, etc. bit corresponds to longitude, while the second, fourth, sixth, etc. bit corresponds to latitude. Each successive bit of the geohash corresponds to an increasingly small geographic region. Thus, a geohash becomes more precise as it becomes longer. For example, one longitude bit defines a region spanning 180 degrees longitude, while two longitude bits defines a region spanning 90 degrees longitude, and three longitude bits defines a region spanning 45 degrees longitude, etc. In other words, the first longitude bit specifies one half of the earth (e.g., western hemisphere or eastern hemisphere), the second longitude bit specifies one fourth of the earth (e.g., the western or eastern portion of the western or eastern hemisphere), and the third longitude bit specifies one eighth.

As an example, an exemplary geohash such as "1100" has longitude values "10" and latitude values "10." The longitude value corresponds to the western half of the eastern hemisphere. The latitude value corresponds to the southern half of the northern hemisphere. The exemplary geohash defines an area roughly comprising Northern and Central Africa, the Mediterranean, the Middle East, India, and Southern Europe.

Raw interaction data can be provided to a database management computer via one or more data sources, including a data stream and an interaction database. The database management computer can process this interaction data and store it in databases or indices. One database may comprise a geographic resource provider database. The geographic resource provider database may store geographic resource provider database entries that relate resource providers to geohashes, for example, by relating a resource provider ID (e.g., "Bob's Grocery Store") to a geohash corresponding to the resource provider's location. Another database may comprise a resource provider interaction database. The resource provider interaction database may store resource provider interaction event database entries that relate resource providers to interactions involving those resource providers (e.g., individual sales or transactions made at "Bob's Grocery Store").

Concurrently, or at a later time, the database management computer may receive requests for interaction data from requestor computers associated with requestors. These requests may be clients, such as scientists or businesspeople that want geographic interaction data in order to perform some form of analysis. Alternatively, the requestor computer may be a data service computer that processes or automatically analyzes the data in order to provide a data service to clients. As an example, a data service computer may provide geographic interaction data to a machine learning model, in order to generate an interaction-related prediction that can be delivered to a client (e.g., the expected sales of a particular merchant during some future time period).

These requests for interaction event data may comprise a location identifier and a boundary element corresponding to a geographic region. The geographic coordinate point may be, for example, a paired latitude and longitude, geohash, region (such as a zip code, city, state, etc.), or the like. The radius may define a maximum distance from the location identifier. A radius is an example of a boundary element. In other words, a request for interaction data may comprise a request for interactions that took place within a certain distance of a location, e.g., within a circular geographic region centered at a geographic coordinate point associated with the location identifier. The request for interaction event data may additionally comprise other qualifiers, restrictions, categories, etc., such as a resource provider identifier, category code, timestamp, and/or the like.

Using the location identifier and the radius, the database management computer can determine one or more geohashes corresponding to the geographic region. The database management computer can query the geographic resource provider database using the one or more geohashes in order to retrieve resource provider identifiers corresponding to the geographic region. Subsequently, the database management computer can query the resource provider interaction event database using the resource provider identifiers (along with any additional qualifiers, such as category codes, timestamps, etc.) to retrieve interaction event data. The database management computer can provide this interaction event data to the requestor computer. The requestor computer and/or the requestor can then take subsequent action based in the interaction event data or derivatives thereof. For example, the requestor computer can use the interaction event data as an input to a machine learning model, in order to generate a classification or prediction. For example, a requestor computer can use interaction event data corresponding to grocery stores within a particular geographic region in order to predict the future sales of a grocery store in that region.

The separation of interaction event data into geographic resource provider indices and resource provider interaction indices, in conjunction with the use of geohashes enables rapid, real-time lookup of interaction data associated with particular geographic regions, geographic coordinates and/or radii. Embodiments are suited to real-time applications in which conventional methods may be too slow.

An experiment was performed to compare performance of a conventional system and an exemplary embodiment. The conventional system comprised an Apache Solr Engine and an Apache Hadoop big data repository. Apache Solr is an open-source, enterprise-search platform. Apache Hadoop is a collection of open-source software utilities that provide a framework for distributed storage and processing of big data.

A coordinate point corresponding to the address "12301 Research Blvd, Austin, TX 78759" was produced, along with a radius of 5 miles. The coordinate point and radius was provided to the conventional system, which subsequently used the Apache Solr Engine to search for and generate a list of grocery stores (e.g., resource providers) within a five mile distance of the coordinate point. The list of grocery stores was used to query the Apache Hadoop big data repository to produce transaction data (e.g., interaction event data) corresponding to the month of January, 2019.

During the experiment, 19 grocery stores were identified by the Apache Solr engine. It took approximately 3 hours for the conventional system to complete the Apache Solr search and produce the transaction data from the Apache Hadoop big data repository.

The coordinate point and radius were likewise provided to a real-time geo-intelligent aggregation engine according to embodiments. This exemplary system used a geographic resource provider index stored in a geographic resource provider database in order to identify the 19 grocery stores. Subsequently, the exemplary system used resource provider identifiers corresponding to the 19 grocery stores to query a resource provider interaction event data index stored in a resource provider interaction event database in order to produce the transaction data. It took approximately 16 milliseconds to identify the grocery stores and produce the transaction data, accomplishing the same result as the conventional system approximately 675,000 times faster.

FIG. 1 shows a real-time geo-intelligent aggregation engine 100 according to some embodiments. The real-time geo-intelligent aggregation engine 100 can comprise an interaction data stream 102, an interaction database 104, a database management computer 106, a geographic resource provider database 108, a resource provider interaction database 110, a client computer 112, a data service computer 114, and a client 116. The computers, systems, database, and entities of FIG. 1 may be in operative communication with one another via one or more communication networks.

A communications network can take any suitable form, which may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as but not limited to a Wireless Application Protocol (WAP), I-mode, and/or the like); and/or the like. Messages between the entities, providers, users, devices, computers and networks may be transmitted using a secure communications protocol such as, but not limited to, File Transfer Protocol (FTP); HyperText transfer Protocol (HTTP); Secure HyperText Transfer Protocol (HTTPS), Secure Socket Layer (SSL), ISO (e.g., ISO 8583) and/or the like.

Some methods according to embodiments are performed by the database management computer 106. Generally, these methods can be separated into two categories. The first category involves receiving interaction event data from interaction event data sources (e.g., interaction data stream 102, interaction database 104, or another interaction event data source), aggregating and/or otherwise processing the interaction event data, and storing the results in geographic resource provider database 108 and resource provider interaction database 110. These methods are described in more detail below with reference to FIG. 5.

The second category of methods involve the database management computer 106 receiving requests for interaction data corresponding to a geographic region from a requestor computer (e.g., client computer 112 or data service computer 114), retrieving interaction event data, or derivatives thereof using the geographic resource provider database 108 and the resource provider interaction database 110, and providing the interaction event data or derivatives thereof to the requestor computer. The requestor computer and/or a requestor (e.g., client 116) can perform subsequent action based on the interaction event data or derivatives thereof. These methods are described in more detail below with reference to FIG. 6.

As an example of subsequent action, the data service computer 114 can use the interaction event data or derivatives thereof as an input to a machine learning model, in order to generate a prediction or classification related to the interaction event data. For exemplary interaction event data corresponding to pollution events, the data service computer 114 could use the interaction event data to predict pollution (e.g., in tons of carbon output) over a future time period. Alternatively, if interaction event data corresponds to business data (e.g., transactions performed), the data service computer could use the interaction event data to predict future sales for businesses in the geographic region.

Before describing embodiments in more detail, it may be useful to describe interaction events, data sets, data values, and data types in order detail.

An interaction event can include activity between two or more parties or entities. An example of an interaction event is a transaction between a merchant and a customer. Another example of an interaction event is a pollution event (e.g., the emission of carbon dioxide into the atmosphere) between the polluter and the surrounding atmosphere.

A data set corresponding to an interaction event is a set of data that describes or characterizes the interaction event. A data type can be the label, name, or identifier corresponding to a data value. For example, for a transaction interaction event, an exemplary data type is "amount spent" and the corresponding data value could be an amount of currency, e.g., $10.00. Other examples of data types include identifiers, such as a merchant category code (e.g., a number used to identify a category of merchant, a merchant category code such as "5411" could correspond to a grocery store, for example), or a payment account number (PAN) used to identify the account from which funds were drawn to pay the merchant during the transaction. Other examples of data types include zip codes and timestamps. As indicated, data values can correspond to both quantitative (e.g., amount spent) and qualitative (e.g., zip code) data types.

FIG. 2 shows some exemplary data sets 204-208 and corresponding data types 202 according to some embodiments. These exemplary data sets 204-208 correspond to interaction events, specifically transactions. Each exemplary data set comprises five data values, corresponding to the five data types 202: location identifier, category code, timestamp, transaction number, and transaction amount. The exemplary data sets 204-208 may individually or collectively be referred to as "interaction event data."

As defined above, a location identifier may include a data value that can be used to identify a location. In FIG. 2, the location identifier data values are zip codes. However, it should be understood that interaction event data may comprise location identifiers other than zip codes, e.g., latitude and longitude coordinates or geohashes as defined above.

Data sets 204-208 are ordered based on timestamp and transaction number. However, data sets 204-208 are neither grouped or aggregated. As defined above, grouped data sets include data sets that are grouped based on one or more common elements or data values, such as location identifier or category code. As defined above, aggregated data sets include data sets in which one or more data values are aggregated, such as transaction amount.

Returning to FIG. 1, interaction data stream 102 may comprise a continuous or periodic source of interaction event data. For example, if the geo-intelligent aggregation engine 100 is used to aggregate pollution data, the interaction data stream 102 may comprise pollution sensing devices that are in the vicinity of industrial or mining zones, such as a networked collection of Internet of Things (IoT) carbon dioxide and carbon monoxide sensors. These pollution sensing devices may stream collected data sets to database management computer 106 continuously or periodically (e.g., every minute, hour, day etc.).

As another example, if the geo-intelligent aggregation engine 100 is used to aggregate business data, the interaction data stream 102 may comprise a payment processing network, such as a network used for credit, debit, or stored value card transactions. Each time a transaction takes place, the interaction data stream 102 can transmit a data set corresponding to that transaction (such as the exemplary data sets of FIG. 2) to the database management computer 106. These data sets may be formatted according to any appropriate standard, such as ISO 8583, a standard for payment transaction data.

In some embodiments, data sets received by database management computer 106 may be initially received or process by a messaging system. The messaging system may be part of database management computer 106 or may be part of an external computer system. A messaging system may comprise a software module used to receive data from interaction data stream 102. An example of messaging software is Apache Kafka, a stream-processing software platform. The messaging system may convert data sets into key-value messages that can be interpreted and processed by database management computer 106.

Interaction database 104 may comprise a database containing data sets corresponding to interaction events that took place in the past. The data sets stored in interaction database 104 may be ungrouped, unordered, and/or unaggregated. The interaction database 104 may be a big-data repository, such as an Apache Hadoop distributed storage system. Interaction database 104 may store data sets corresponding to interaction events that took place prior to the implementation of geo-intelligent aggregation engine 100.

There may be a large number of data sets stored in interaction database 104. As such, the database management computer 106 may receive or retrieve data sets stored in interaction database 104 in batches. Each batch may comprise a number of data sets. Each batch may be a fixed number of data sets (e.g., 10,000) or an arbitrary number of data sets. Each batch may correspond to a particular time period (e.g., a one minute time period, one hour time period, one day time period, one year time period, etc.), such that each data set in the batch corresponds to the particular time period.

The interaction data stream 102 and interaction database 104 may individually or collectively be referred to as interaction event data sources in some embodiments.

As described above, database management computer 106 is a computer system that can perform methods associated with aggregating or otherwise preparing interaction event data. This may comprise receiving interaction event data from interaction event data sources (e.g., interaction data stream 102 and interaction database 104), aggregating and otherwise preparing the interaction event data and storing the results in the geographic resource provider database 108 and resource provider interaction database 110. Additionally, the database management computer 106 can perform methods associated with providing interaction event data to requestor computers (e.g., client computer 112 or data service computer 114). Specific components and software modules of database management computer 106 are described in more detail below with reference to FIG. 10.

The geographic resource provider database 108 may be any appropriate data structure or system used to store geographic resource provider database entries. These geographic resource provider database entries may define associations between resource providers (e.g., merchants) and geohashes associated with regions where those resource providers operate (e.g., the physical address associated with a brick and mortar store). Geographic resource provider database entries may be better understood with reference to FIG. 3.

Figure 3:
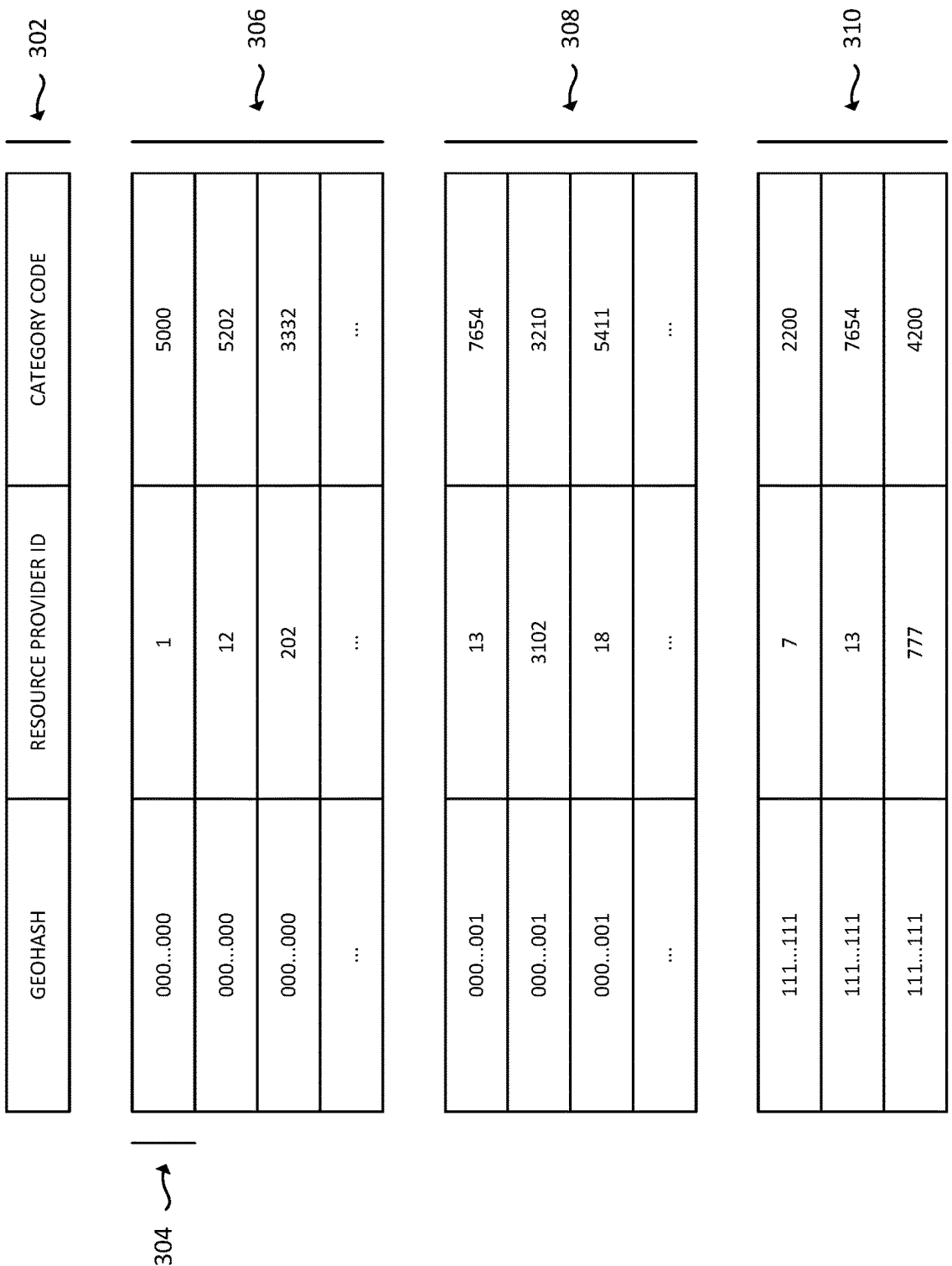
FIG. 3 shows a diagram of exemplary geographic resource provider database entries according to some embodiments.

FIG. 3 shows exemplary grouped data sets 306-310 corresponding to geographic resource provider database entries. Each exemplary data set comprises three data values, corresponding to data types 302 (e.g., geohash, resource provider identifier, and category code). Although three data types are shown, geographic resource provider database entries may comprise any number of data values corresponding to any number of data types.

Data set 304 corresponds to a single geographic resource provider database entry, comprising a data value corresponding to a geohash (000 . . . 000), a resource provider identifier (1), and a category code (5000). Embodiments of the invention may support geohashes of any length. However, in a preferred embodiment, geohash data values may comprise 52 bit integers.

A resource provider identifier may comprise a data value used to identify a specific resource provider. The resource provider identifiers of FIG. 3 are numerical identifiers, however, in some embodiments of the invention, resource provider identifiers may comprise strings (e.g., "Bob's Department Store") or hybrid identifiers, comprising both strings and numerical identifiers.

Category codes may comprise data values used to generally indicate a category corresponding to a particular resource provider. For merchant resource providers, category codes may comprise business categories, such as "grocery store" or "movie theater." Numerical category codes may correspond to these business categories.

Geographic resource provider database entries may be grouped based on any number of appropriate data values, for example, geohash, as indicated in groups 306-310 of FIG. 3. Further, groups of geographic resource provider database entries may be ordered sequentially based on one or more data values, such as geohashes.

In some embodiments, multiple geographic resource provider database entries may have the same resource provider identifier. In FIG. 3, a geographic resource provider database entry in group 308 and in group 310 has the resource provider identifier 13. This may be the case when a particular resource provider operates in multiple different regions, such as a national chain that operates in different regions throughout a country.

Geographic resource provider database entries may be queried or retrieved from geographic resource provider database 108 based on any appropriate data type or data value. For example, the geographic resource provider database 108 may be queried to return all geographic resource provider database entries corresponding to a particular combination of geohashes, resource provider identifiers and category codes, or any other data type not pictured in FIG. 3.

Returning to FIG. 1, the resource provider interaction database 110 may be any appropriate data structure or system used to store resource provider interaction event database entries. These resource provider interaction event database entries may define associations between resource providers (e.g., merchants) and interaction events (e.g., transactions) associated with those resource providers. Resource provider interaction event database entries may be better understood with reference to FIG. 4.

FIG. 4 shows several aggregated groups of resource provider interaction event database entries 406-408, an individual resource provider interaction event database entry 404, and data types 402. The resource provider interaction event database entries of FIG. 4 correspond to transaction interaction events. As such, the data types correspond to transactions and include a resource provider identifier, a timestamp (e.g., corresponding to a time at which the transaction took place), a transaction number and a transaction amount. However, it should be understood that embodiments can make use of any number of appropriate data types and data values, including, for example, category codes or payment account information associated with each transaction (e.g., a payment account number (PAN)).

Each group of resource provider interaction event database entries 406-408 in FIG. 4 may be grouped based on resource provider identifier. Additionally, these groups may be ordered based on timestamp or transaction number, such that within each group, the resource provider interaction event database entries proceed in ascending or descending timestamp order. Further, as shown in FIG. 4, the resource provider interaction event database entries may be aggregated based on one or more data values, such as the transaction amount data value. In FIG. 4, the transaction amount data value is a cumulative sum for each successive resource provider interaction event database entry.

Aggregation may be useful for quickly determining the amount spent over a given time period. For example, to calculate the total amount spent at resource provider "10" between May 5, 2019 and Jun. 5, 2019, the transaction amount $2254.88 can be subtracted from the transaction amount $654.88, for a total spending of $1600.00. If the transaction amount data values were not aggregated, it would be necessary to sum each individual transaction amount data value in group 406. As indicated by transaction number, there are 31 total transactions corresponding to resource provider "10." Summing the transaction amounts would require 30 addition operations, as opposed to a single subtraction operation when the values are aggregated. Because fewer operations are required, aggregation enables much quicker calculation of data values corresponding to time periods than traditional summation methods.

Data values corresponding to resource provider interaction event database entries may be referred to, individually or collectively as "interaction event data." Any data or other information derived from interaction event data may be referred to as "a derivative thereof." Examples of derivatives include the sum, difference (as described above), product, ratio, etc., of data values corresponding to the same or different interaction events.

Returning to FIG. 1, the geographic resource provider database 108 and the resource provider interaction database 110 may be implemented as separate databases. Alternatively, the geographic resource provider database 108 and the resource provider interaction database 110 may be implemented as a single database system. The data stored in geographic resource provider database 108 and resource provider interaction database 110 (e.g., geographic resource provider database entries and resource provider interaction event database entries) may be referred to as indexes, e.g., as a "geographic resource provider index" and a "resource provider interaction event index."

Client computer 112 can be a computer system associated with a client 116. Client 116 may operate client computer 112 in order to interface with database management computer 106. Client 116 may use client computer 112 in order to request interaction event data from database management computer 106. Client computer 112 may be a requestor computer. In some embodiments, client computer 112 may be a personal computer or other personal computing device (e.g., a smart phone, desktop computer, smart watch, tablet, etc.) In other embodiments, client computer 112 may be a server computer (such as an enterprise server computer) associated with a business or organizational (e.g., government) client 116.

Data service computer 114 can be a computer system associated with a data service that is provided to clients and client computers, such as client 116 and client computer 112. A data service may comprise any service that involves the manipulation, processing, or display of data. For example, data service computer 114 could be associated with a data visualization service that involves generating visualizations (e.g., charts, graphs, etc.) corresponding to data for clients. As another example, data service computer 114 could use interaction event data provided by database management computer 106 as an input to a machine learning model in order to generate predictions or classifications. For example, if interaction event data comprises transactional data, the data service computer 114 could use the interaction event data as an input to a machine learning model in order to predict the business prospects of a particular resource provider in the future, such as whether or not the resource provider will continue to be in business. The data service computer 114 can deliver or otherwise provide it's data service to client computer 112. Like client computer 112, data service computer 114 may be a requestor computer.

Figure 5:
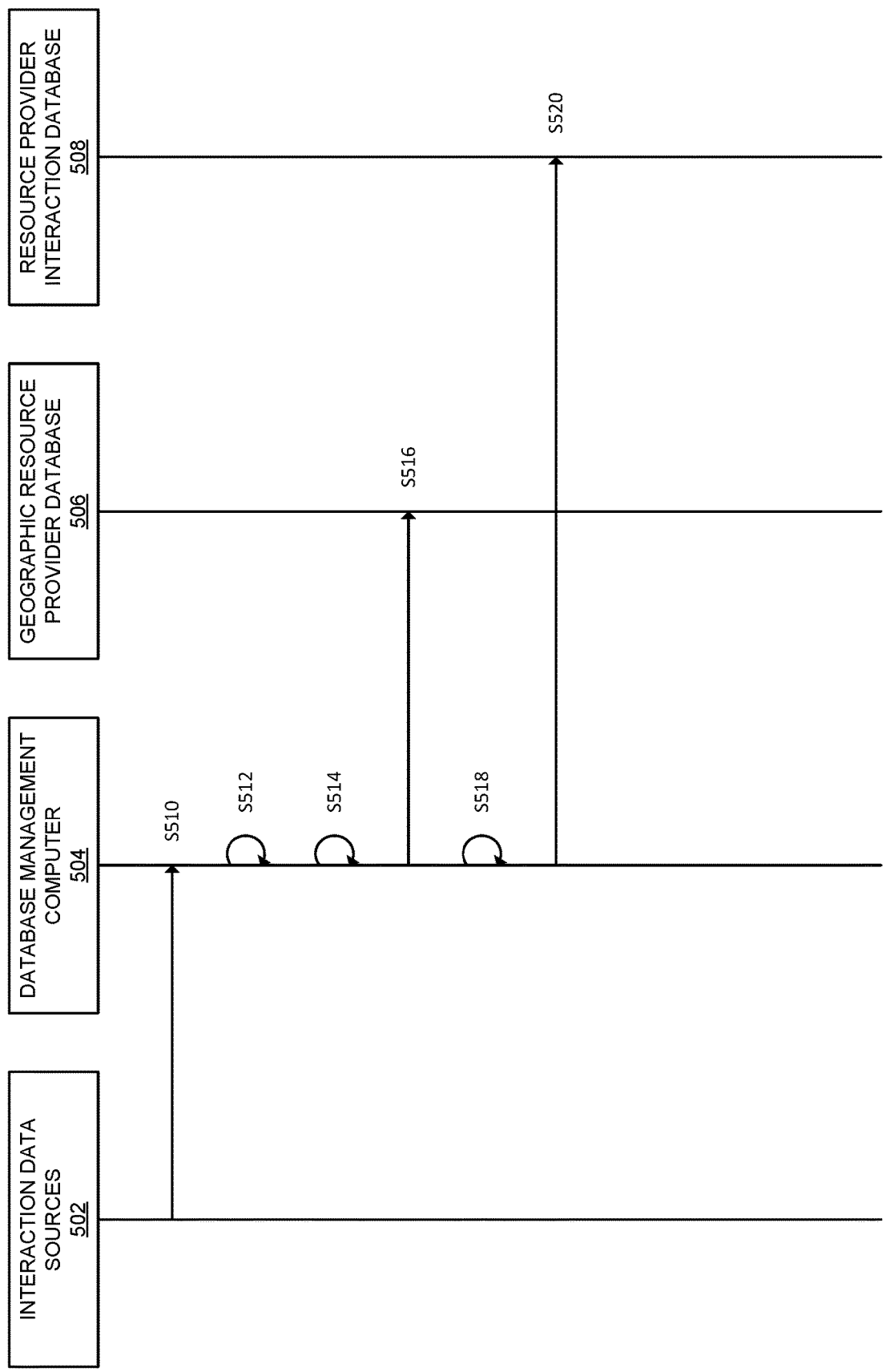
FIG. 5 shows a sequence diagram of an exemplary method of geo-intelligent interaction data aggregation according to some embodiments.

Methods of aggregating or otherwise preparing interaction event data will now be described with reference to FIG. 5, which shows a sequence diagram of a method according to some embodiments.

At step S510, database management computer 504 can receive one or more data sets corresponding to interaction events from interaction data sources 502 (e.g., interaction data stream 102 and interaction database 104 from FIG. 1).

Each data set of the one or more data sets may comprise a resource provider identifier (e.g., a numerical identifier or a string such as "Bob's Department Store") and a geographic region identifier (e.g., a geohash, latitude and longitude, zip code, string such as "New York," etc.). The geographic region identifier may also be referred to as a location identifier. The data sets may also be referred to as interaction event data. The data sets may be received periodically or continuously, individually or in batches. The data sets may be unaggregated and unordered.

At step S512, database management computer 504 can determine, for each data set, a geohash based on the geographic region identifier. For some data sets, the geographic region identifier may be a geohash, and as such, the determination may comprise retrieving the data value corresponding to the geographic region identifier. For other data sets, the geographic region identifier may comprise paired latitude and longitude coordinate values. Determining the geohash may comprise computing the geohash based on the paired latitude and longitude coordinate values, for example, determining a 26 bit integer corresponding to the latitude coordinate value, determining a 26 bit integer corresponding to the longitude coordinate value, then interleaving the two integers to produce a 52 bit geohash.

For other data sets, the geographic region identifier may comprise a zip code or a string indicating a geographic region (e.g., "New York City" or "New York State.") The database management computer 504 can determine the geohash using a look-up table or another appropriate data structure that matches geographic region identifiers to geohashes.

At step S514, database management computer 504 can generate one or more geographic resource provider database entries, each geographic resource provider database entry comprising a resource provider identifier and a corresponding geohash. The geographic resource provider database entries may be similar to the geographic resource provider database entries shown in FIG. 3.

The database management computer 504 can generate the one or more geographic resource provider database entries by collecting data from the one or more data sets received at step S510. For example, the database management computer 504 can parse the one or more data sets, identify data values corresponding to resource provider identifiers and pair those resource provider identifiers with corresponding category codes and geohashes determined in step S512.

At step S516, the database management computer 504 can store the one or more geographic resource provider database entries in geographic resource provider database 506, using any appropriate database storage procedure. The database management computer 504 can stored the geographic resource provider database entries in order (e.g., in ascending or descending order based on geohash) and in groups (e.g., such that geographic resource provider database entries corresponding to the same or similar geohashes are stored in association with one another).

At step S518, the database management computer 504 can generate one or more resource provider interaction event database entries, each resource provider interaction event database entry comprising a resource provider identifier and a data set corresponding to an interaction event. The data set corresponding to the interaction event may comprise data values such as a timestamp, and in the case of transactional data, data such as transaction number and transaction amount.

The one or more resource provider interaction event database entries may be similar to the resource provider interaction event database entries shown in FIG. 4. The geographic resource provider database entries may be grouped based on one or more data values (e.g., geographic resource provider database entries corresponding to the same resource provider identifier may be grouped in association with one another.) Further, one or more data values may be aggregated. For example, if the resource provider interaction event database entries comprise data values corresponding to transaction amount, the transaction amount data values may be aggregated in a cumulative sum.

The database management computer 504 can generate the one or more resource provider interaction event database entries using data sets received at step S510. For example, the database management computer 504 can parse the data sets and determine data values associated with resource provider identifiers, timestamps, transaction numbers, transaction amounts, etc. The database management computer 504 can collect and format this data into the one or more resource provider interaction event database entries.

At step S520, the database management computer 504 can store the one or more resource provider interaction event database entries in the resource provider interaction database 508 using any appropriate database storage procedure. The database management computer 504 can store the resource provider interaction event database entries in order (e.g., in ascending or descending timestamp order) and in groups (e.g., such that resource provider interaction event database entries corresponding to the same resource provider identifier are stored in association with one another).

Figure 6:
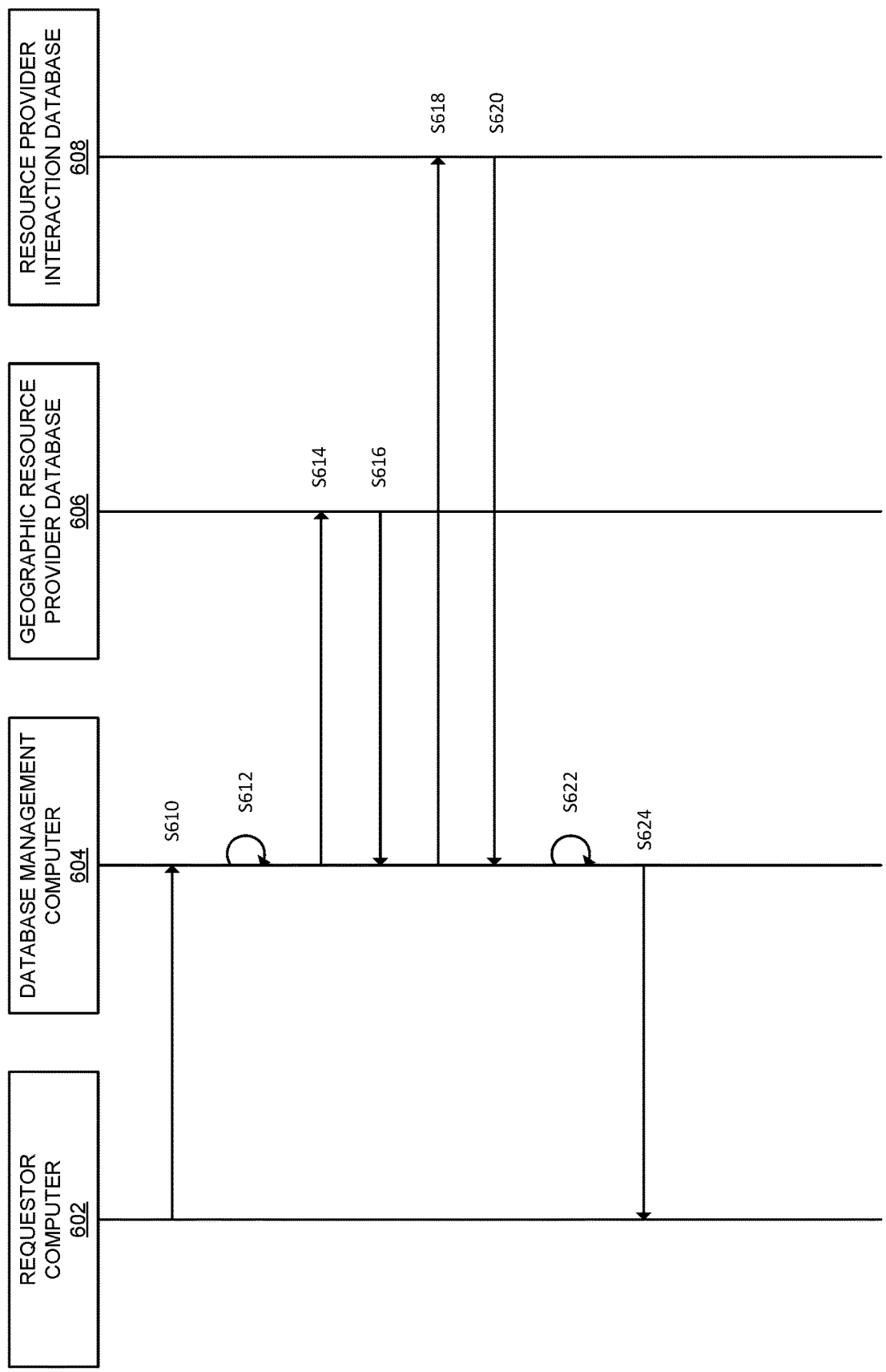
FIG. 6 shows a sequence diagram of an exemplary method of providing interaction event data to a requestor computer according to some embodiments.

Methods of retrieving and providing interaction event data to requestor computers may be better understood with reference to FIG. 6, which shows a sequence diagram of a method according to some embodiments.

At step S610, database management computer 604 (e.g., database management computer 106 from FIG. 1) can receive a request for interaction event data corresponding to a geographic region from requestor computer 602 (e.g., client computer 112 or data service computer 114 from FIG. 1).

The request may comprise a location identifier (e.g., paired latitude and longitude values, GPS coordinates, geohash, zip code, string identifying a location (e.g., "New York City"), etc.,) as well as a radius. As indicated in the terms section above, location identifiers may also be referred to as "geographic region identifiers." The location identifier and radius may define a circular geographic region centered at a coordinate associated with the location identifier. For location identifiers corresponding to GPS coordinates, paired latitude or longitude values, geohashes, etc., the coordinate associated with the location identifier may be the location identifier itself. For location identifiers corresponding to zip codes, or strings identifying locations, the coordinate may be any appropriate coordinate corresponding to the location identifier. For example, for a location identifier such as "New York City," the coordinate may be the geographic center of New York City, or a coordinate associated with city hall or another well-known landmark.

The radius may be a search radius, indicating that the requestor wants interaction event data corresponding to interaction events (e.g., transactions) that take place within a one radius (or other outward metric defining an area) distance of the coordinate point. In some embodiments, the request may additionally comprise a time range and a resource provider category (e.g., a category code), indicating that the request is for interaction event data corresponding to the time range and resource provider category. For example, a requestor may want transaction data (interaction event data) corresponding to grocery stores (resource provider category) between Jun. 1, 2019 and Jul. 1, 2019 (time range) within a five mile radius of the center of zip code 94612 (location identifier).

At step S612, the database management computer 604 can determine one or more geohashes corresponding to the geographic region based on the location identifier and the radius. These geohashes may be used to identify resource providers and interaction data corresponding to the requestor's request. There are a number of ways in which these one or more geohashes can be determined, some examples are presented in FIG. 7.

Figure 7:
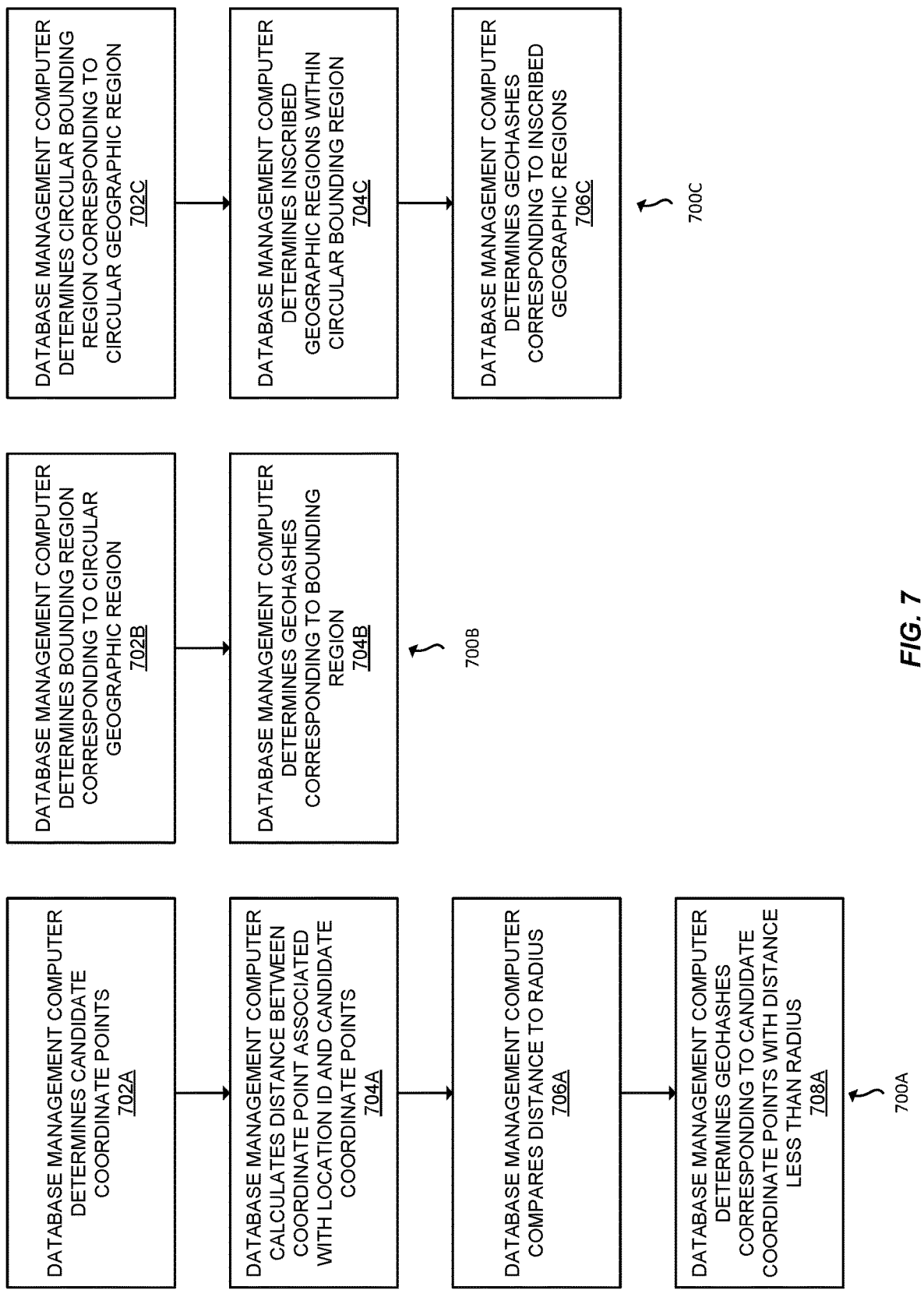
FIG. 7 shows three flowcharts corresponding to exemplary methods of generating geohashes according to some embodiments.

FIG. 7 shows three flowcharts of exemplary methods of determining the one or more geohashes. It should be understood that these methods are non-limiting examples. Flowchart 700A shows a method of determining geohashes based on distance comparisons, Flowchart 700B shows a method of determining geohashes using a bounding region, and Flowchart 700C shows a method of determining geohashes using inscribed geographic regions.

Referring to Flowchart 700A, at step 702A, the database management computer can determine one or more candidate coordinate points. The one or more candidate coordinate points can correspond to any appropriate geographic coordinate system, e.g., paired latitude and longitude values, GPS coordinates, geohashes, etc. The one or more candidate coordinate points may correspond to coordinate points that could potentially be within a one radius distance of a coordinate point associated with the location identifier. There are a number of ways in which the one or more candidate coordinate points can be determined. For example, the one or more candidate coordinate points can be determined using a rough distance estimate based on the location identifier. As an example, if the location identifier is a zip code such as 94612 (corresponding to Oakland, CA), the candidate coordinate points could be coordinate points corresponding to the city of Oakland, the state of California, the west coast of the United States, etc.

As another example, the one or more candidate coordinate points may be geohashes that share some common feature with a geohash associated with the location identifier. For example, the candidate coordinate points may be geohashes that have some number of bits in common with the geohash associated with the location identifier. For a geohash associated with a location identifier such as "1100110" the candidate coordinate points may be the eight geohashes that share the same four most significant bits (MSBs) with the geohash associated with the location identifier, e.g., "1100 . . ." The number of shared bits may be proportional to the radius, e.g., for larger radii, the candidate coordinate points share a lower number of MSBs than for smaller radii.

In some embodiments, the one or more candidate coordinate points may be derived from geographic resource provider database entries stored in the geographic resource provider database.

At step 704A, for each candidate coordinate point of the one or more candidate coordinate points, the database management computer can determine a distance between the candidate coordinate point and a coordinate point associated with the location identifier, thereby determining one or more distances. The database management computer can use any appropriate method to determine the distance between the candidate coordinate points and the location identifier. For example, the database management computer can use trigonometric functions to calculate the great circle distance between each candidate coordinate point and the coordinate point associated with the location identifier.

At step 706A, for each distance of the one or more distances calculate in step 704A, the database management computer can determine whether the distance exceeds the radius by comparing the distance to the radius. Distances larger than the radius indicate that the corresponding candidate coordinate point is not within the geographic region. Distances smaller than the radius indicate that the corresponding candidate coordinate is within the geographic region.

At step 708A, for each distance of the one or more distances that does not exceed the radius, the database management computer can determine a geohash corresponding to the corresponding candidate coordinate point, thereby determining one or more geohashes corresponding to the geographic region. The database management computer can determine these geohashes using any appropriate method. For example, if the candidate coordinate points comprise latitude and longitude values, the database management computer can interleave these latitude and longitude values to create a corresponding geohash.

Flowchart 700B shows another exemplary method of determining one or more geohashes corresponding to the geographic region. At step 702B, the database management computer can determine a bounding region corresponding to a circular geographic region defined by the location identifier and the radius, such that the circular geographic region is inscribed within the bounding region. This step may be better understood with reference to FIG. 8

Figure 8:
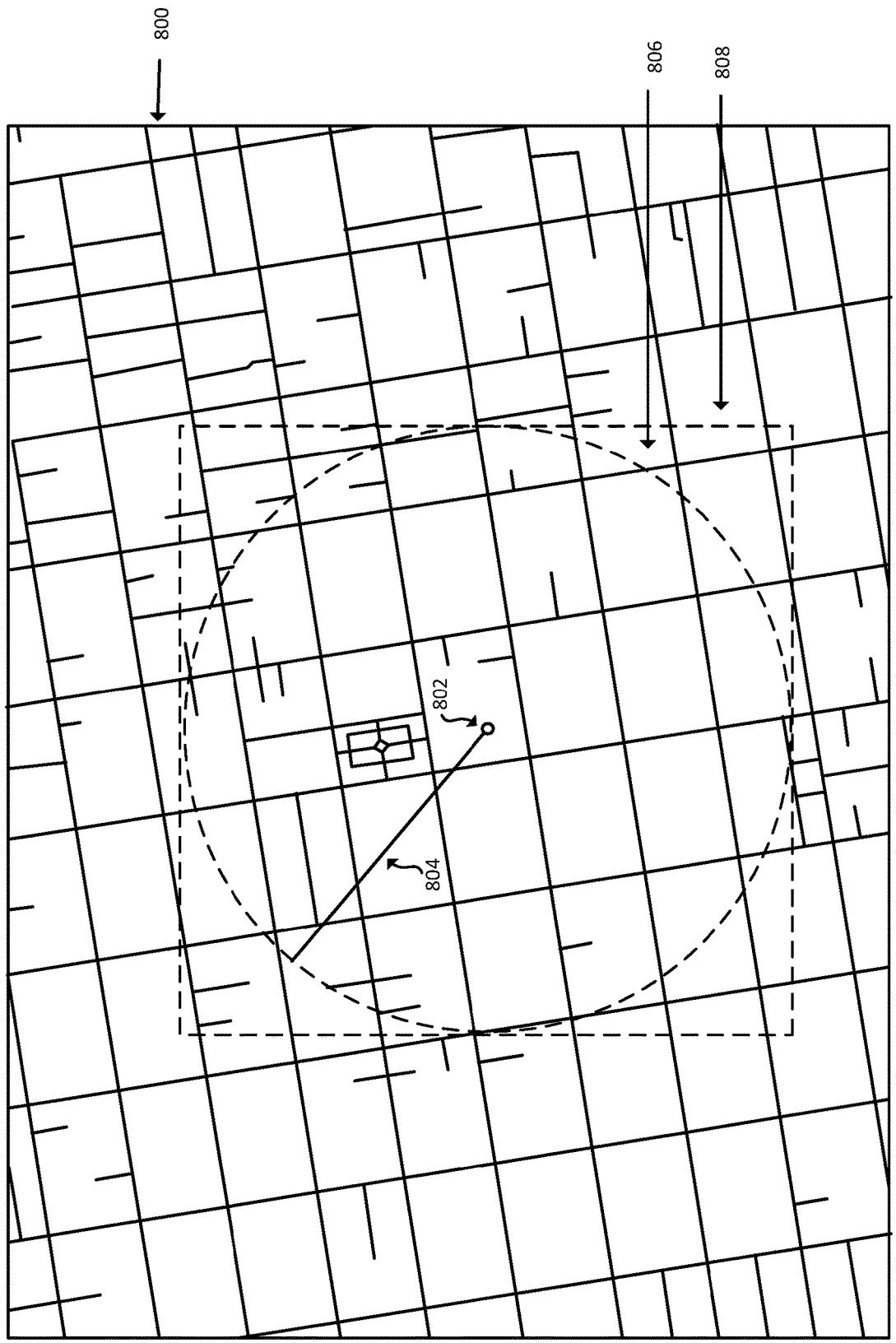
FIG. 8 shows a diagram of a map and a circular geographic region used to illustrate an exemplary method of generating geohashes according to some embodiments.

FIG. 8 shows a map of several blocks of a city 800, a coordinate point associated with a location identifier 802, a radius 804, a circular geographic region 806 defined by the coordinate point 802 and radius 804, and a bounding region 808. As shown in FIG. 8, the circular geographic region 806 is inscribed within the bounding region 808.

Returning to FIG. 7, at step 704B, the database management computer can determine one or more geohashes corresponding to the bounding region, wherein the one or more geohashes corresponding to the geographic region (e.g., the geographic region referenced in step S612 of FIG. 6) are the one or more geohashes corresponding to the bounding region.

In other words, the database management computer can determine geohashes corresponding to a square bounding region that inscribes the circular geographic region. As geohashes are based off the latitude and longitude coordinate system, geohashes generally relate to rectangular land areas (e.g., land areas bound within a specific latitude range and a specific longitude range). As such, square or rectangular geographic regions can typically be defined quicker and using less data than circular geographic regions.

Flowchart 700C shows another exemplary method of determining one or more geohashes corresponding to the geographic region. At step 702C, the database management computer can determine a circular bounding region corresponding to a circular geographic region defined by the location identifier and the radius.

At step 704C, the database management computer can determine one or more inscribed geographic regions, the one or more inscribed geographic regions inscribed by the circular bounding region. Step 704C can be better understood with reference to FIG. 9.

Figure 9:
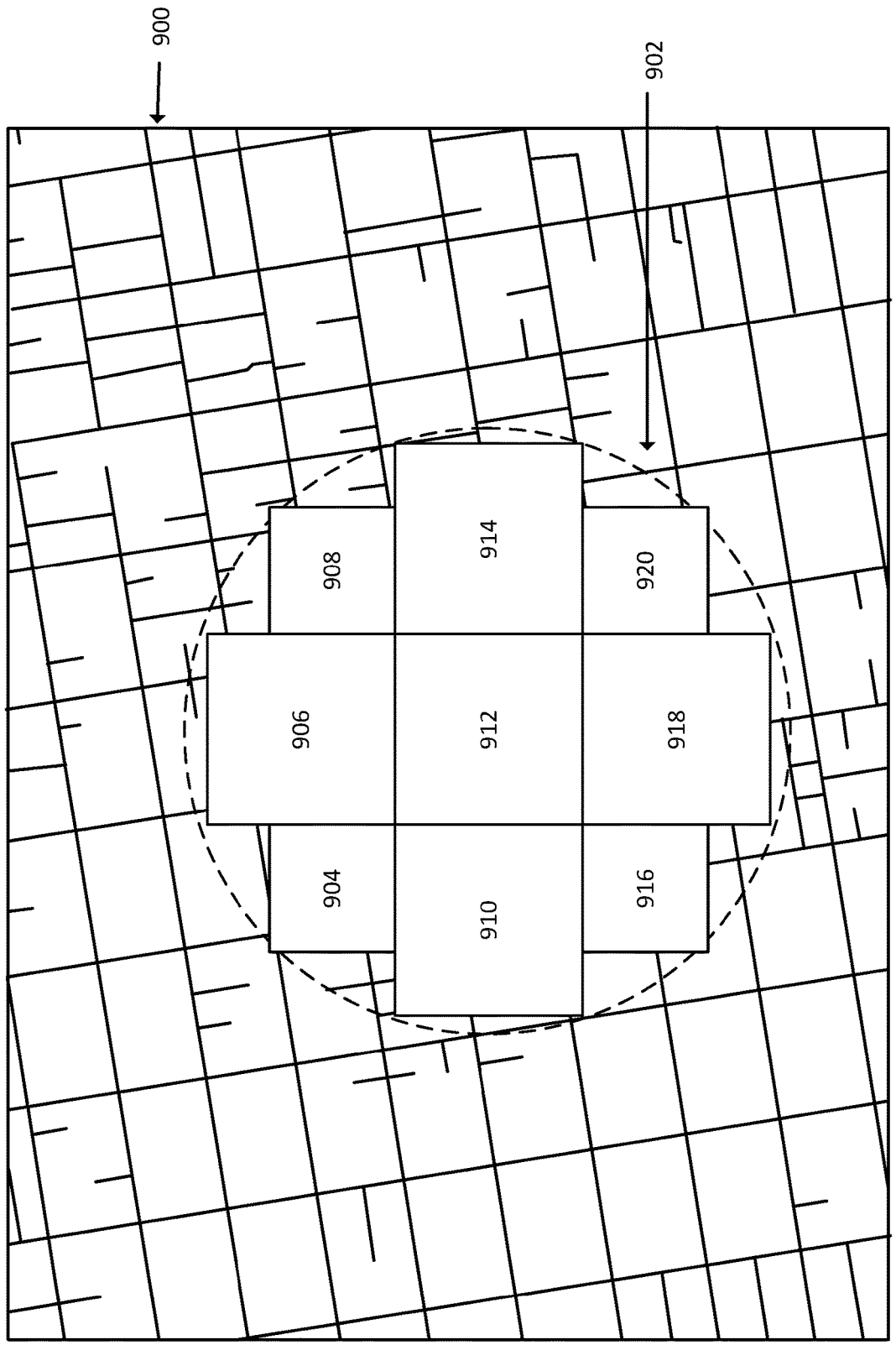
FIG. 9 shows a diagram of a map, circular geographic region, and a plurality of inscribed geographic regions used to illustrate an exemplary method of generating geohashes according to some embodiments.

FIG. 9 shows a map of several blocks of a city 900, as well as a circular geographic region 902. FIG. 9 additionally shows nine inscribed geographic regions 904-920. The inscribed geographic regions 904-920 can be rectangular or square regions of any size, provided that the inscribed geographic regions 904-920 are collectively inscribed by the circular geographic region 902. The inscribed geographic regions 904-920 can generally approximate the area and shape of the circular geographic region 902. The database management computer can use any appropriate method of approximating the area of the circular geographic region 902 in order to determine the inscribed geographic regions 904-920, for example, modified versions of the midpoint circle algorithm or Bresenham's circle algorithm.

Returning to FIG. 7, at step 706C, the database management computer can determine one or more geohashes corresponding to the one or more inscribed geographic regions, wherein the one or more geohashes corresponding to the geographic region are the one or more geohashes corresponding to the one or more inscribed geographic regions.

In other words, the database management computer can determine geohashes corresponding to inscribed geographic regions that are inscribed by the circular geographic region. As described above, geohashes generally relate to rectangular land areas (e.g., land areas bound within a specific latitude range and a specific longitude range). As such, circular geographic regions typically can be defined in terms of rectangular land areas that approximate those circular geographic regions. Unlike the method of flowchart 700B, the method of flowchart 700C allows the circular geographic region to be defined to arbitrary precision, at the cost of additional memory requirements and speed.

It should be understood that the methods of FIG. 7 are intended only as non-limiting examples. Moreover, the methods of FIG. 7 can be combined in any appropriate manner. For example, method 700B could be used to determine the candidate coordinate points (e.g., coordinate points corresponding to the square bounding region), that can then be tested for distance using the method of 700A.

Returning to FIG. 6, at step S614, the database management computer 604 can query the geographic resource provider database 606 using one or more geohashes to determine one or more resource provider identifiers. The database management computer 604 may request resource provider identifiers corresponding to geographic resource provider database entries that are associated with the geohashes determined during step S612. The database management computer 604 may use any appropriate querying method, for example, SQL queries for SQL databases, or no-SQL queries for no-SQL databases such as Redis.

At step S616, the database management computer 604 can receive the one or more resource provider identifiers from geographic resource provider database 606.

At step S618, the database management computer 604 can query resource provider interaction database 608 using the one or more resource provider identifiers to determine one or more interaction events. The database management computer 604 may request resource provider interaction event database entries corresponding to the resource provider identifiers obtained in step S616. The database management computer 604 may use any appropriate querying method, e.g., SQL or no-SQL queries as described above.

At step S620, the database management computer 604 can retrieve, from the resource provider interaction database 608, interaction event data or derivatives thereof. This interaction event data may comprise interaction event data values such as those shown in FIG. 4 (e.g., for transaction data, timestamps, transaction numbers, transaction amounts, etc.). Derivatives thereof may comprise data values derived from these data values, e.g., sums or differences of interaction event data values. In some embodiments, the interaction event data or derivatives thereof may comprise a different between two interaction values corresponding to two interaction data sets, such as the difference between two aggregated "amount spent" data values.

At optional step S622, in some embodiments, the database management computer 604 may calculate or otherwise determine derivatives of the interaction event data retrieved at step S620, rather than retrieving the derivatives from the resource provider interaction database 608. The database management computer 604 may use any appropriate method to calculate or otherwise determine the derivatives of the interaction event data.

At step S624, the database management computer 604 can provide the interaction event data or derivatives thereof to the requestor computer 602. The requestor computer 602 and/or a requestor can take subsequent action based on the interaction event data or derivatives thereof. As indicated above, in some embodiments the requestor computer 602 can be a client computer or a data service computer. As indicated above, examples of subsequent action include, for example, using the interaction event data or derivatives thereof as an input to a machine learning model in order to produce a classification or prediction associated with the interaction event data, such as predicting the sales associated with a particular merchant resource provider at some time in the future.

Figure 10:
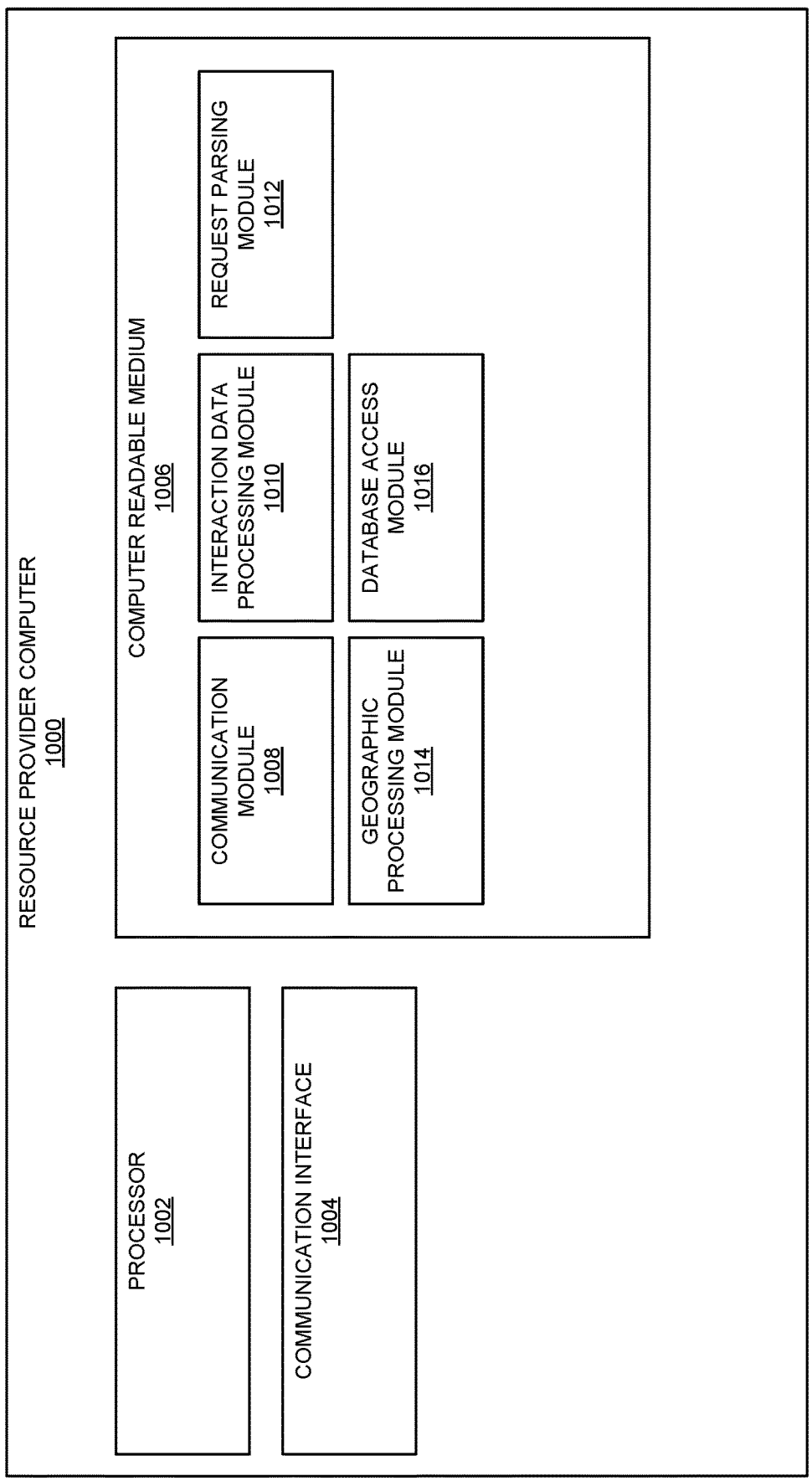
FIG. 10 shows a block diagram of a resource provider computer according to some embodiments.

FIG. 10 shows a system block diagram of a resource provider computer 1000 according to some embodiments. The resource provider computer 1000 comprises a processor 1002, a communication interface 1004, and a computer readable medium 1006. The computer readable medium 1006 may comprise or store a number of software modules, including a communication module 1008, an interaction data processing module 1010, a request parsing module 1012, a geographic processing module 1014, and a database access module 1016.

Processor 1002 may be any suitable processing apparatus or device as described in the terms section above. The communication interface 1004 may comprise a network interface that enables the resource provider computer 1000 to communicate with other computers or systems over a network such as the Internet.

Communication module 1008 may comprise code or software executable by the processor 1002 for establishing communication between the resource provider computer 1000 and other entities, including databases such as the interaction database, geographic resource provider database, or resource provider interaction event database, as well as requestor computers such as client computers or data service computers. The resource provider computer 1000 may use the communication module 1008 to receive interaction event data from data sources such as an interaction data stream or interaction database. The resource provider computer 1000 may additionally use the communication module 1008 to transmit interaction event data to requestor computers.

The interaction data processing module 1010 may comprise code or software, executable by the processor 1002 for processing and aggregating interaction data. This may include code or software used to implement the methods of FIG. 5, as described above. The interaction data processing module 1010 may be used to generate geographic resource provider database entries and resource provider interaction event database entries and store the database entries in the geographic resource provider database and resource provider interaction database respectively.

The request parsing module 1012 may comprise code or software, executable by processor 1002 for parsing requests from requestor computers. This can involve parsing requests to determine location identifiers, radiuses, time ranges, category codes, and other information that may be used by resource provider 1000 in order to service those requests.

The geographic processing module 1014 may comprise code or software, executable by processor 1002 for determining geographic regions, geohashes, and other geographic information, as described above with reference to FIGS. 6-7. The geographic processing module 1014 may provide or support the use of mathematical functions, such as the calculation of great circle distances, the generation of geohashes based on location identifiers or coordinate points, and the approximation of circular geographic regions, as described above.

The database access module 1016 may comprise code or software executable by processor 1002 for accessing databases, including interaction databases, geographic resource provider databases, resource provider interaction databases, and the like. The database access module 1016 may comprise code enabling the processor to generate queries, including SQL and no-SQL queries in order to access the above-mentioned databases.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method comprising:
   receiving, by a database management computer, from a requestor computer associated with a requestor, a request for interaction event data corresponding to a geographic region, the request comprising a location identifier and a boundary element;

determining, by the database management computer, one or more geohashes corresponding to the geographic region based on the location identifier and the boundary element;

querying by the database management computer, a geographic resource provider database using the one or more geohashes to determine one or more resource provider identifiers, the geographic resource provider database including a first plurality data sets that are grouped based on a geohash identifier;

querying, by the database management computer, a resource provider interaction database using the one or more resource provider identifiers to determine one or more interaction events, wherein the resource provider interaction database includes a second plurality of data sets that are grouped based on a resource provider identifier, each data set in the second plurality of data sets including one or more data records that are characterized by a transaction identifier including an aggregate value, and wherein the geographic resource provider database is different than the resource provider interaction database;

retrieving, by the database management computer, from the resource provider interaction database, interaction event data or derivatives thereof; and providing, by the database management computer, the interaction event data or derivatives thereof to the requestor computer, wherein the requestor computer and/or the requestor takes subsequent action based on the interaction event data or derivatives thereof.

2. The method of claim 1 further comprising:

receiving, by the database management computer, the second plurality of data sets corresponding to interaction events, wherein each data set included in the second plurality of data sets comprises a resource provider identifier and a geographic region identifier;

determining, by the database management computer, for each data set, a geohash based on the geographic region identifier;

generating, by the database management computer, one or more geographic resource provider database entries, each geographic resource provider database entry comprising a resource provider identifier and a corresponding geohash;

storing, by the database management computer, the one or more geographic resource provider database entries in the geographic resource provider database;

generating, by the database management computer, one or more resource provider interaction event database entries, each resource provider interaction event database entry comprising a resource provider identifier and a data set corresponding to an interaction event; and storing, by the database management computer, the one or more resource provider interaction event database entries in the resource provider interaction database.

3. The method of claim 1, wherein the boundary element is a radius.

4. The method of claim 3, wherein determining, by the database management computer, one or more geohashes corresponding to the geographic region based on the location identifier and the radius comprises:

determining, by the database management computer, one or more candidate coordinate points;

for each candidate coordinate point of the one or more candidate coordinate points, determining, by the database management computer, a distance between the candidate coordinate point and a coordinate point associated with the location identifier, thereby determining a set of one or more distances;

for each distance of the set of one or more distances, determining, by the database management computer, whether the distance exceeds the radius; and for each distance of the set of one of more distances that does not exceed the radius, determining, by the database management computer, a geohash corresponding to a corresponding candidate coordinate point, thereby determining one or more geohashes corresponding to the geographic region.

5. The method of claim 3, wherein determining, by the database management computer, one or more geohashes corresponding to the geographic region based on the location identifier and the radius comprises:

determining, by the database management computer, a bounding region corresponding to a circular geographic region defined by the location identifier and the radius, such that the circular geographic region is inscribed within the bounding region; and determining, by the database management computer, one or more geohashes corresponding to the bounding region, wherein the one or more geohashes corresponding to the geographic region are the one or more geohashes corresponding to the bounding region.

6. The method of claim 3, wherein determining, by the database management computer, one or more geohashes corresponding to the geographic region based on the location identifier and the radius comprises:

determining, by the database management computer, a circular bounding region corresponding to a circular geographic region defined by the location identifier and the radius;

determining, by the database management computer, one or more inscribed geographic regions, the one or more inscribed geographic regions inscribed by the circular bounding region; and determining, by the database management computer, one or more geohashes corresponding to the one or more inscribed geographic regions, wherein the one or more geohashes corresponding to the geographic region are the one or more geohashes corresponding to the one or more inscribed geographic regions.

7. The method of claim 1, wherein the interaction event data includes a time range and/or a resource provider category, and wherein the request includes the time range and/or the resource provider category.

8. The method of claim 1, wherein the interaction event data is aggregated and ordered.

9. The method of claim 1, wherein the interaction event data or derivatives thereof comprises a difference between two interaction values corresponding to two interaction data sets.

10. The method of claim 1, wherein the requestor computer is a data service computer.

11. A database management computer comprising:
a processor; and
a non-transitory computer readable medium coupled to the processor, the non-transitory computer readable medium comprising code, executable by the processor for implementing a method comprising:

receiving, from a requestor computer associated with a requestor, a request for interaction event data corresponding to a geographic region, the request comprising a location identifier and a boundary element;

determining one or more geohashes corresponding to the geographic region based on the location identifier and the boundary element;

querying a geographic resource provider database using the one or more geohashes to determine one or more resource provider identifiers, the geographic resource provider database including a first plurality data sets that are grouped based on a geohash identifier;

querying a resource provider interaction database using the one or more resource provider identifiers to determine one or more interaction events, wherein the resource provider interaction database includes a second plurality of data sets that are grouped based on a resource provider identifier, each data set in the second plurality of data sets including one or more data records that are characterized by a transaction identifier including an aggregate value, and wherein the geographic resource provider database is different than the resource provider interaction database;

retrieving, from the resource provider interaction database, interaction event data or derivatives thereof; and providing, by the database management computer, the interaction event data or derivatives thereof to the requestor computer, wherein the requestor computer and/or the requestor takes subsequent action based on the interaction event data or derivatives thereof.

12. The database management computer of claim 11, wherein the method further comprises:

receiving the second plurality of data sets corresponding to interaction events, wherein each data set included in the second plurality of data sets comprises a resource provider identifier and a geographic region identifier;

determining for each data set, a geohash based on the geographic region identifier;

generating one or more geographic resource provider database entries, each geographic resource provider database entry comprising a resource provider identifier and a corresponding geohash;

storing the one or more geographic resource provider database entries in the geographic resource provider database;

generating one or more resource provider interaction event database entries, each resource provider interaction event database entry comprising a resource provider identifier and a data set corresponding to an interaction event; and storing the one or more resource provider interaction event database entries in the resource provider interaction database.

13. The database management computer of claim 11, wherein the boundary element is a radius.

14. The database management computer of claim 13, wherein determining one or more geohashes corresponding to the geographic region based on the location identifier and the radius comprises:

determining one or more candidate coordinate points;

for each candidate coordinate point of the one or more candidate coordinate points, determining a distance between the candidate coordinate point and a coordinate point associated with the location identifier, thereby determining a set of one or more distances;

for each distance of the set of one or more distances, determining whether the distance exceeds the radius; and for each distance of the set of one or more distances that does not exceed the radius, determining a geohash corresponding to a corresponding candidate coordinate point, thereby determining one or more geohashes corresponding to the geographic region.

15. The database management computer of claim 13, wherein determining one or more geohashes corresponding to the geographic region based on the location identifier and the radius comprises:

determining a bounding region corresponding to a circular geographic region defined by the location identifier and the radius, such that the circular geographic region is inscribed within the bounding region; and determining one or more geohashes corresponding to the bounding region, wherein the one or more geohashes corresponding to the geographic region are the one or more geohashes corresponding to the bounding region.

16. The database management computer of claim 13, wherein determining one or more geohashes corresponding to the geographic region based on the location identifier and the radius comprises:

determining a circular bounding region corresponding to a circular geographic region defined by the location identifier and the radius;

determining one or more inscribed geographic regions, the one or more inscribed geographic regions inscribed by the circular bounding region; and determining one or more geohashes corresponding to the one or more inscribed geographic regions, wherein the one or more geohashes corresponding to the geographic region are the one or more geohashes corresponding to the one or more inscribed geographic regions.

17. The database management computer of claim 11, wherein the interaction event data includes a time range and/or a resource provider category, and wherein the request includes the time range and/or the resource provider category.

18. The database management computer of claim 11, wherein the interaction event data is aggregated and ordered.

19. The database management computer of claim 11, wherein the interaction event data or derivatives thereof comprise a difference between two interaction values corresponding to two interaction data sets.

20. The database management computer of claim 11, wherein the requestor computer is a client computer.

* * * * *